Aug. 30, 1932. K. H. ANDRÉN 1,874,216
INSULATION PUSH-BACK MACHINE
Filed Feb. 24, 1930 7 Sheets-Sheet 1

Inventor
K. H. Andrén
by W H Lieber
Attorney

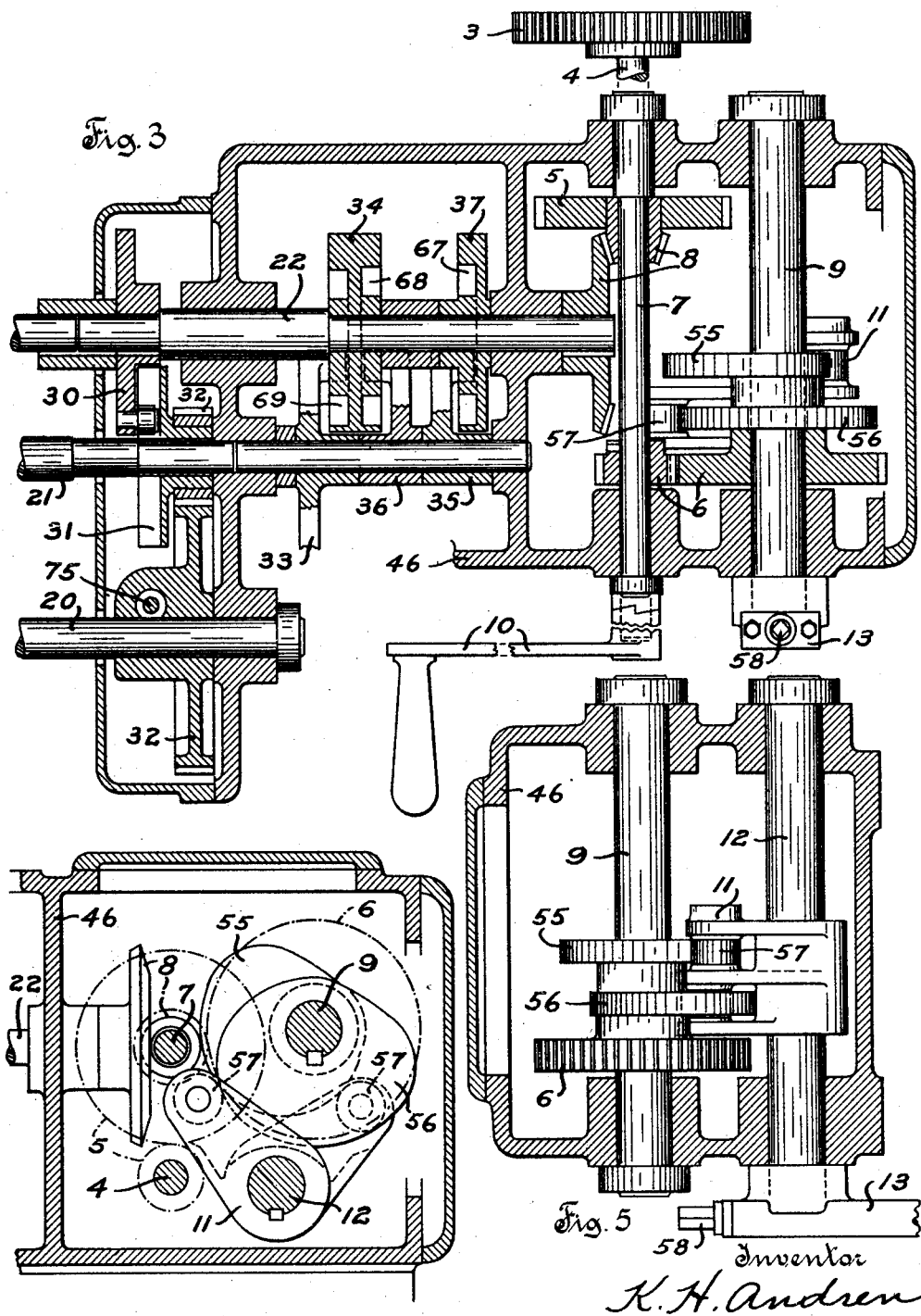

Aug. 30, 1932.  K. H. ANDRÉN  1,874,216
INSULATION PUSH-BACK MACHINE
Filed Feb. 24, 1930    7 Sheets-Sheet 3
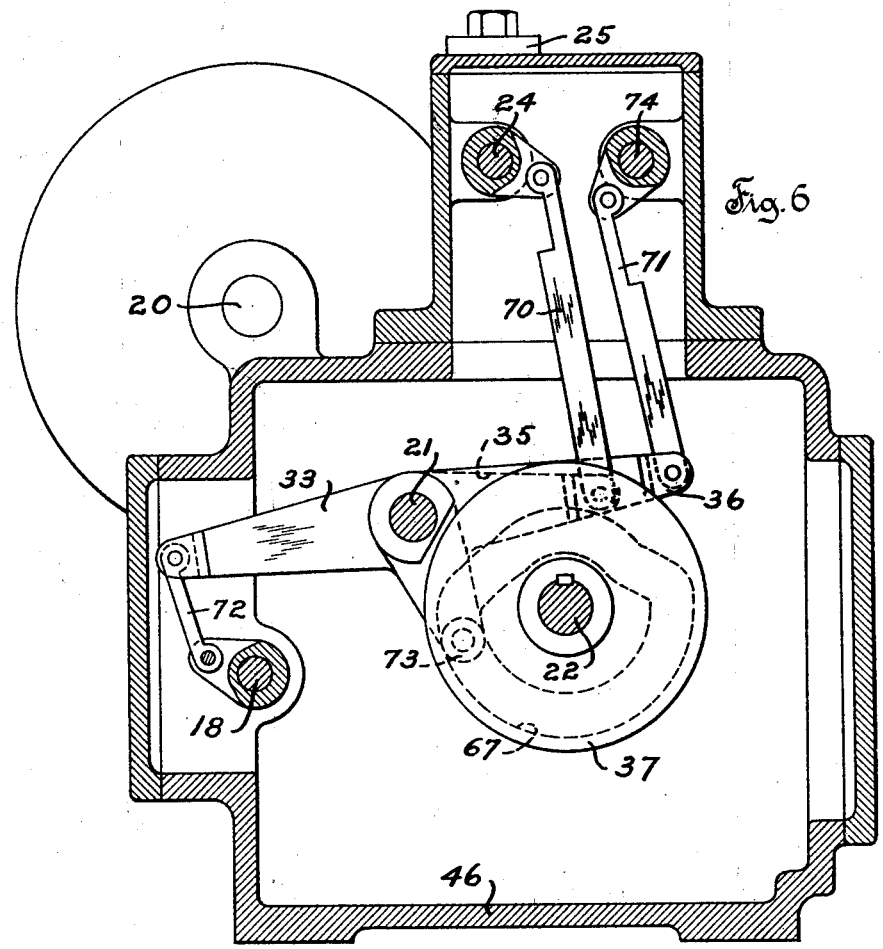
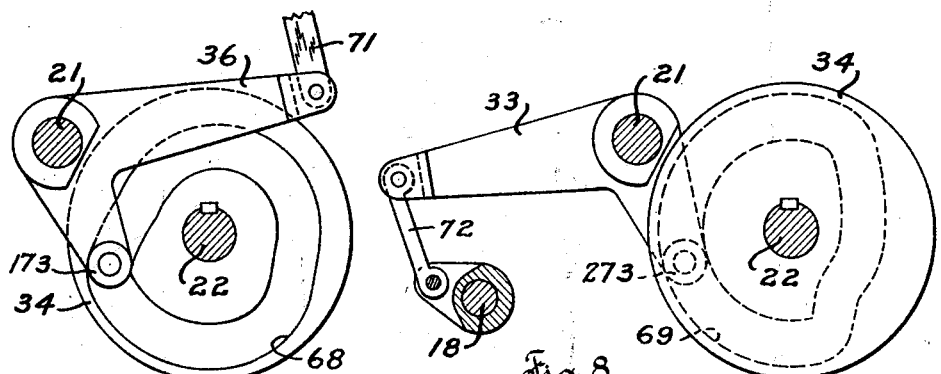

Inventor
K. H. Andren
by W H Lieber
Attorney

Aug. 30, 1932. K. H. ANDRÉN 1,874,216
INSULATION PUSH-BACK MACHINE
Filed Feb. 24, 1930 7 Sheets-Sheet 5
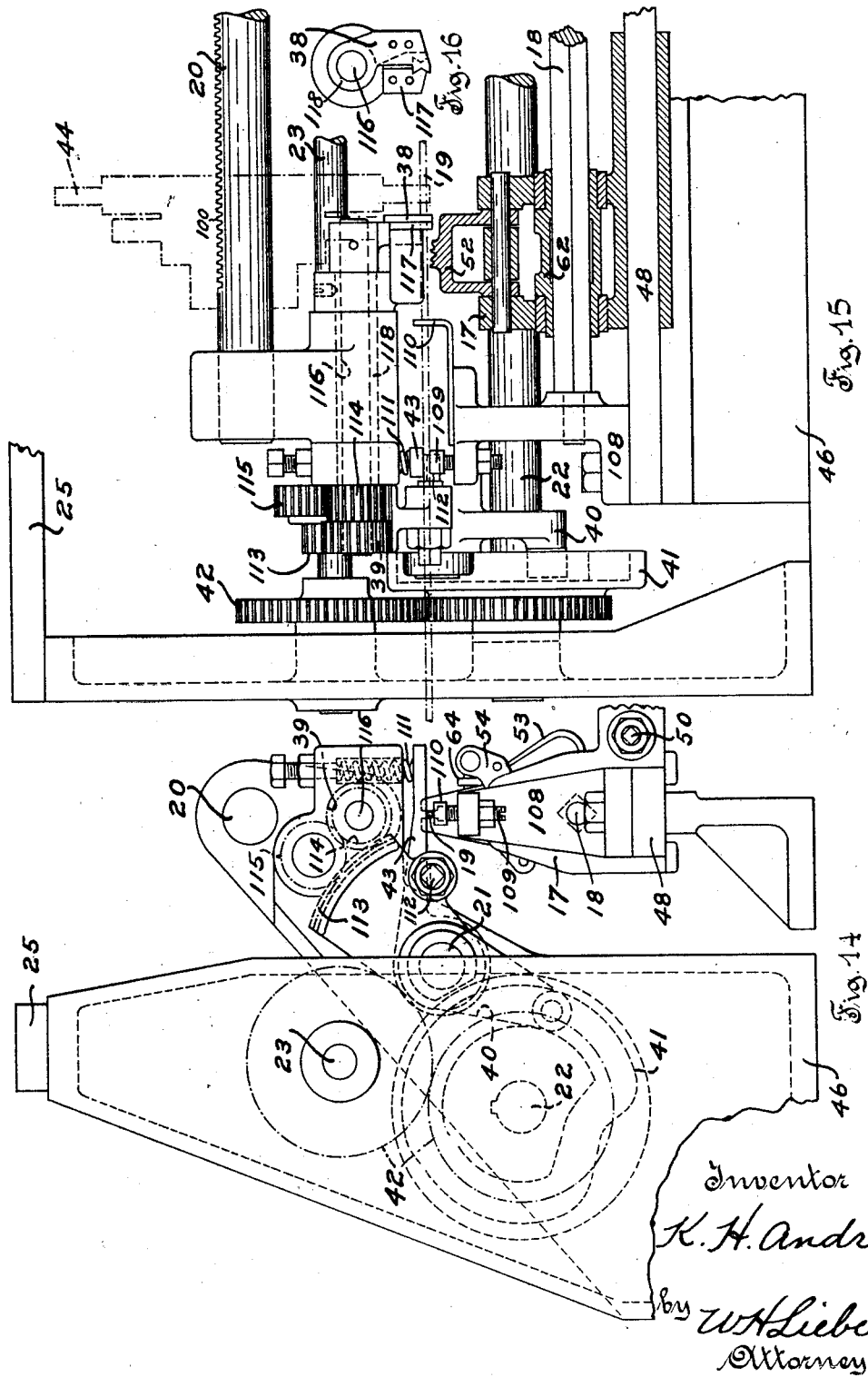

Aug. 30, 1932.  K. H. ANDRÉN  1,874,216
INSULATION PUSH-BACK MACHINE
Filed Feb. 24, 1930  7 Sheets-Sheet 6
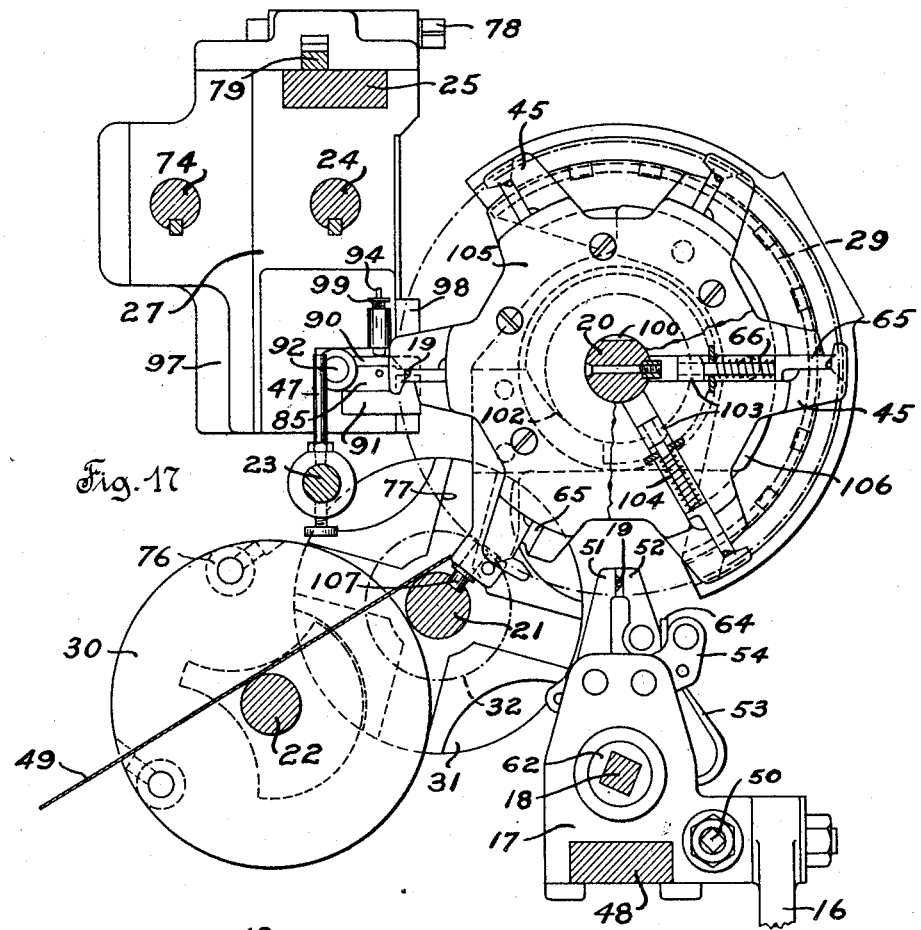
Fig. 17
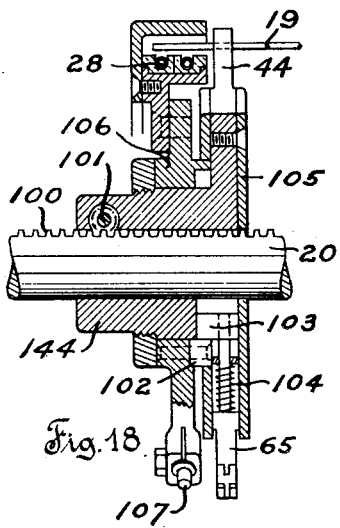
Fig. 18
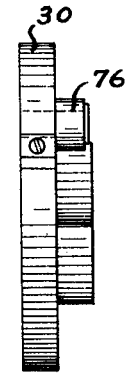
Fig. 19
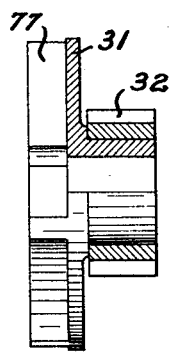
Fig. 20
Fig. 21
Inventor
K. H. Andren
by W. H. Lieber
Attorney Aug. 30, 1932.  K. H. ANDRÉN  1,874,216

INSULATION PUSH-BACK MACHINE

Filed Feb. 24, 1930   7 Sheets-Sheet 7

Inventor
K. H. Andrén
by W. H. Lieber
Attorney

Patented Aug. 30, 1932

1,874,216

UNITED STATES PATENT OFFICE

KARL H. ANDRÉN, OF MILWAUKEE, WISCONSIN, ASSIGNOR TO ARTOS ENGINEERING COMPANY, OF MILWAUKEE, WISCONSIN, A CORPORATION OF WISCONSIN

INSULATION PUSH-BACK MACHINE

Application filed February 24, 1930. Serial No. 430,890.

The present invention relates in general to improvements in the art of removing coverings from certain portions of elongated material, and relates more specifically to an improved method of and apparatus for removing insulation or the like from end portions of wire, cable or similar material.

An object of the invention is to provide an improved method of removing coverings from selected portions of elongated material, and an improved machine for automatically exploiting the method.

It has long been common practice in the art of preparing electrical connections for use in switch boards and other electrical appliances, to remove the insulation from the ends of wires, by stripping. The stripping operation ordinarily comprises cutting laterally through the insulation at the desired distance from one or both ends of each wire, and subsequently pulling the severed piece of insulation longitudinally from the end of the wire. While such stripping is quite satisfactory for treating relatively heavy wires or cables having rather thick and hard insulating coatings, it is not adapted for the removal of thin fabric and other coverings from the ends of light wires or cables. When it is attempted to cut the thin coverings of such light materials, and in order to insure clean cutting thereof, the knife frequently passes beyond the insulation and enters the material itself, thereby weakening the ends of solid wires, and in the case of stranded cables, causing some of the strands to be severed. While it has been attempted to remove the end coverings of fine wires by burning the insulation away, this mode of removing the coating is objectionable due to the high cost and the difficulties encountered with insulation of varying characteristics. These prior methods of removing insulation, furthermore, do not produce clean surfaces at the uncovered portions of the wires.

The present invention contemplates provision of an improved method of removing insulation or the like from elongated material such as wire, without necessitating cutting or burning of the insulation prior to removal thereof, thus eliminating danger of injury to the stock. The invention also contemplates provision of improved machinery for automatically exploiting the new process, which is extremely efficient and flexible in operation. In accordance with the improved method, the coating material at the portion of the stock which is to be uncovered, may be initially heated, after which the heated covering is merely pushed along the stock to thereby uncover the desired portion thereof. The heating may however be dispensed with if desired, and the insulation removed while cold. The wire stock may also be severed into successive pieces of equal length, and the insulation simultaneously removed from both ends of each piece, and the length of the pieces may be readily varied as desired. The insulation whether pre-heated or not, may either be pushed back from the ends of the pieces and allowed to thus remain after setting, or, if this is objectionable, the pieces of insulation may be pulled off of the ends of the wire. The foregoing, as well as other objects and advantages will appear from the following detailed description.

A clear conception of the various steps of the improved method and of the details of construction and mode of operation of one embodiment of the invention, may be had by referring to the drawings accompanying and forming a part of this specification in which like reference characters designate the same or similar parts in the various views.

While various specific terms have been employed herein in order to facilitate description of the invention, it is not intended to thereby unnecessarily restrict the scope. The term "push-back" as employed herein is intended to include any shifting of the coating longitudinally of the stock. The term "wire" should be interpreted to include any elongated stock having characteristics similar to those of ordinary wire. The term "insulation" is intended to define any coating or covering, whether possessed of electrical insulating qualities, or not.

Referring to the drawings:—

Fig. 1 is a diagram showing generally the details of construction of an improved insulation push-back machine for cutting covered wire into successive pieces and for subsequently removing the covering from the opposite ends of each piece. In this diagram, some of the machine parts are distorted and others have been displaced from their normal positions in order to enhance the clearness of the disclosure.

Fig. 3 is an enlarged horizontal section of a fragment of the actuating mechanism of the improved insulation removing machine.

Fig. 4 is a similarly enlarged longitudinal vertical section through a portion of the actuating mechanism shown in Fig. 3.

Fig. 5 is a similarly enlarged transverse vertical section through the wire feed actuating mechanism.

Fig. 6 is a similarly enlarged transverse vertical section through another portion of the actuating mechanism shown in Fig. 3.

Fig. 7 is an end view of one of the cams of the actuating mechanism.

Fig. 8 is a similar end view of the cam shown in Fig. 7, with the front cam groove omitted in order to permit clearer disclosure (in dotted lines) of the rear groove.

Fig. 14 is an end elevation of a fragment of the push-back machine, looking toward the wire feeding and cutting mechanism.

Fig. 15 is a front part-sectional elevation of a fragment of the push-back machine, showing the wire feeding and cutting mechanism.

Fig. 16 is an end view of the wire severing knife.

Fig. 17 is a transverse vertical section through the push-back machine, the section being taken between the heating and push-back mechanisms.

Fig. 18 is a longitudinal vertical section through one of the heating and conveying mechanisms.

Fig. 19 is a front elevation of a part of one of the intermittent motion transmitting mechanisms.

Fig. 20 is a part sectional front elevation of another part of the intermittent motion transmitting mechanism of Fig. 19.

Fig. 21 is a transverse vertical section through the hub and support for one of the heating elements.

Figure 1:
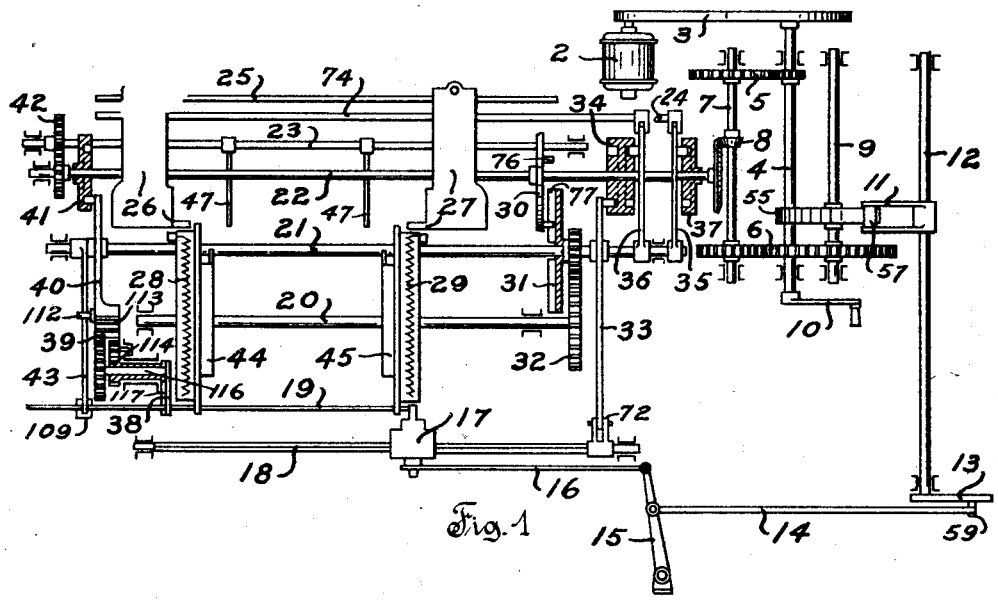

The improved push-back machine specifically illustrated, comprises in general, mechanism for automatically feeding wire stock 19 of the like from a spool or roll, into the machine and for severing the stock into successive lengths; a pair of laterally spaced rotary carriers or spiders 44, 45 and cooperating heating elements 28, 29 for conveying and initially treating the opposite ends of the successive pieces of stock 19; a pair of push-back clamping devices 26, 27 for removing the insulation from the opposite ends of the successive pieces of wire; wire removers 47 revolvable to remove the successive finished pieces of stock 19 from the conveying mechanisms; and mechanism for automatically actuating the various treating and conveying mechanisms in properly timed relation to each other, all mounted upon a suitable frame 46, see the general diagram of Fig. 1.

The mechanism for automatically feeding the stock to the machine to permit severance thereof into proper lengths, consists of a feed clamp bracket 17 reciprocable along a guide 48 and carrying oscillatory jaws 51, 52 adapted to grip the end of the stock 19 as it enters the machine, see 1, 2, 22, 23 and 24. The bracket 17 is intermittently movable along the guide 48 in opposite directions by means of a crank 13 which is oscillatably supported by a shaft 12, and is provided with a pivot block 59 adjustable along the crank 13 by means of a threaded rod 58 to vary the effective throw of the crank and hence the limits of reciprocation of the bracket 17. The pivot block 59 is connected with the medial portion of an oscillatory motion transmitting arm 15 by means of a connection 14, and a link 16 connects the upper swinging end of the arm 15 with a pivot block 60 which is adjustably supported upon a threaded rod 50 carried by the bracket 17. The gripping jaws 51, 52 are swingably supported upon the bracket 17 by means of parallel pivot shafts, and are oscillatory about these shafts by means of a double crank block 62 which is slidable along and oscillatable by means of a square actuating bar or shaft 18. The crank block 62 is provided with an abutment adapted to engage a stop 63 on the bracket 17 to limit the closing movement of the jaws 51, 52, and carries two crank pins one of which is connected with the actuating arm of the jaw 51 by means of a link 61, and the other of which is resiliently connected with the adjustable actuating bracket 54 of the other jaw 52, by means of a U-shaped leaf spring 53. The bracket 54 is adjustable relative to the jaw 52 by means of an element 64 having oppositely threaded ends coacting with knuckles carried by the bracket 54 and jaw 52 respectively, so that rotation of the element 64 will vary the gripping pressure between the jaws 51, 52, when closed.

The mechanism for cutting or severing the stock 19 as it is fed into the machine by the jaws 51, 52, consists of a pair of oppositely oscillatory knife blades 38, 117 operable in a vertical plane past which the clamping and feeding mechanism just described, is adapted to feed successive equal lengths of the stock 19, see Figs. 1, 2, 14, 15 and 16. The blade 38 is secured to one end of a shaft 116 having an actuating spur gear 39 at the opposite end thereof; and the blade 117 is secured to one end of a sleeve 118 embracing the shaft 116 and having an actuating spur gear 114 at its opposite end. The gear 114 meshes with an idler gear 115, and both the idler gear 115 and the actuating gear 39 for the knife 38, mesh with gear segment 113 which is oscillatable upon the fixed shaft 21 by means of an actuating arm 40 carrying a roller cooperating with the groove of a rotary cam 41 secured to the shaft 22. The entering wire stock 19 passes through a guide 110 carried by a bracket 108 and through a clamping device comprising an adjustable anvil 109 carried by the bracket 108, and a clamp 43 which is constantly urged toward the anvil 109 by means of a coil spring 111. A pin 112 carried by the oscillatory gear segment 113 is adapted to lift the clamp 43 against the spring pressure during each upward movement of the segment 113, that is, while the stock 19 is being advanced. The knife blades 38, 117 are oppositely oscillatable by the segment 113 coacting with the gear 39 and idler 115.

The mechanism for conveying and heating the opposite ends of the successive pieces of stock 19 after severance thereof from the entering strand, consists of a pair of laterally spaced spiders 44, 45 rotatable with and supported between detachable guide plates 105 secured to rotary hubs 144, and arcuate heating elements 28, 29 secured to fixed supports 106 mounted upon the rotary hubs 144, see Figs. 1, 2, 17, 18 and 21. The hubs 144 are adjustably supported by the intermittently rotatable rack shaft 20, and are provided with adjusting pinions 101 coacting with the rack 100 formed on the shaft 20 as shown in Figs. 18 and 21. The fixed heating element supports 106 are laterally adjustable with the hubs 144, but are prevented from rotating therewith by means of locking pins 107 coacting with a longitudinal groove in the fixed shaft 21. The spiders 44, 45 are provided with circumferentially spaced carrier hooks formed to engage the successive pieces of covered stock 19 inwardly of their opposite ends, and to carry the pieces with their ends exposed to the heating zones, about the axis of the shaft 20. A gripping clamp 65 is urged radially outwardly toward each of the carrier hooks of the spiders 44, 45, by means of a coil spring 66, these clamps serving to hold the stock while being severed and to maintain the pieces of stock in proper position. The inner ends of the clamps 65 are provided with blocks 103 secured to clamp rods 104, and the blocks 103 are adapted to engage a stationary clamp retracting block 102 carried by the fixed support 106. The blocks 102, 103 cooperate to retract the successive clamps 65 as the successive pieces of stock 19 are finished and before the succeeding pieces are picked up by the carrier spiders 44, 45, and the heating elements 28, 29 may be operated electrically or otherwise as by a gas flame, or dispensed with.

The insulation push-back mechanism consists of a pair of laterally spaced clamping devices 26, 27 carried by a stationary guide 25 and adjustable therealong by means of pinions 78 coacting with a rack 79 secured directly to the guide 25, see Figs. 1, 2, 9, 10, 11, 12 and 17. Each of the devices 26, 27 comprises a support slidable along the guide 25 and along a pair of parallel grooved shafts 24, 74. A driving pinion 81 carried by each of the push-back supports, is splined to the shaft 24 and meshes with a vertically movable rack 82. A driving pinion 80 likewise carried by each of the push-back supports, is splined to the shaft 74 and meshes with a vertically movable rack 83. Each rack 82 also meshes with a pinion segment 84 which is secured to a clamp jaw pivot shaft 92 secured to a jaw carrier 85, the segment 84 being slidable along the rack 82 as well as being oscillatable thereby. Each rack 83 is provided with two sets of teeth, one of which coacts with the adjacent driving pinion 80, and the other of which coacts with a driven pinion 87 secured to one end of a counter shaft 88 the opposite end of which carries a crank 89. The crank 89 of each push-back device is connected with the carrier 85 thereof, by means of a link 86 coacting with a pivot 96 attached to the carrier. The cooperation between the segment 84 and the carrier 85, is such that when the carrier 85 is reciprocated by the crank 89, the segment 84 moves laterally across the rack 82 without disengaging the teeth thereof. Attached to the outer end of each jaw carrier 85, is a lower fixed jaw 91, with which an upper oscillatory jaw 90 is cooperable to clamp the adjacent ends of the successive pieces of stock 19 during the push-back operation. The upper jaws 90 are constantly resiliently urged toward the lower jaws 91 and a stop pin, by means of plungers 94 and springs 93 the latter of which may be properly tensioned by means of adjustable caps 99. Each of the push-back devices is also provided with detachable housing and guide plates 97, 98 the former of which form guides for the racks 83 and the latter of which serve to confine and guide the carriers 85.

Figure 2:
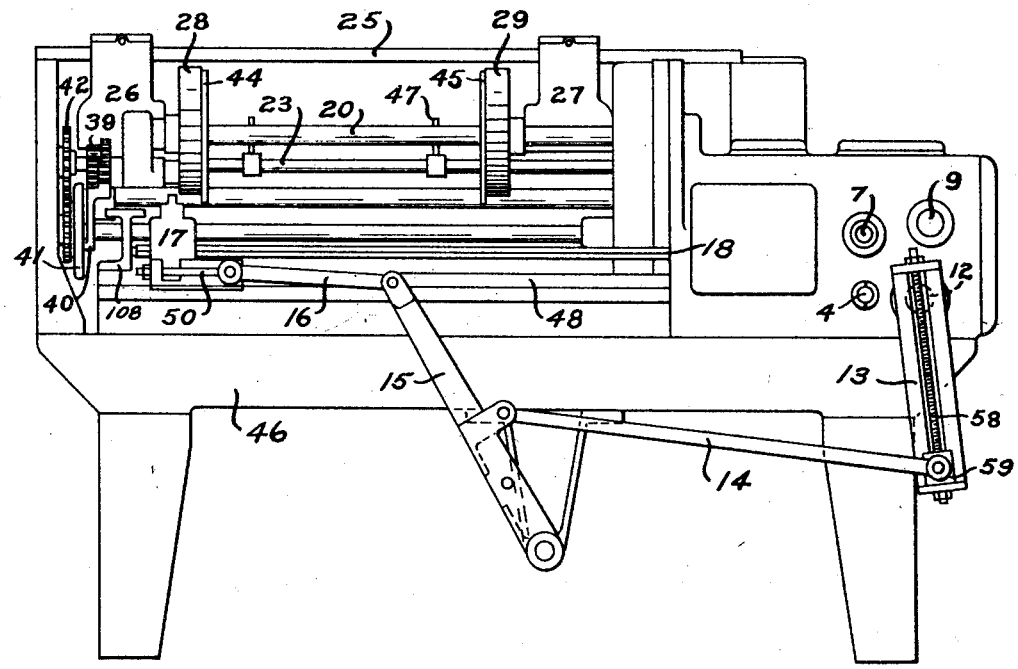
Fig. 2 is a front elevation of the improved push-back machine.
Figure 9:
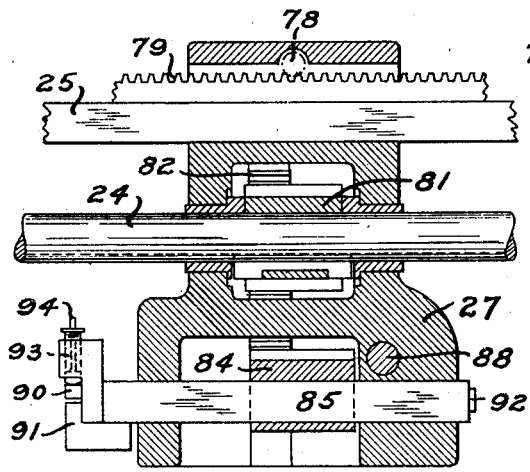
Fig. 9 is an enlarged longitudinal vertical section through one of the insulation push-back mechanisms.
Figure 10:
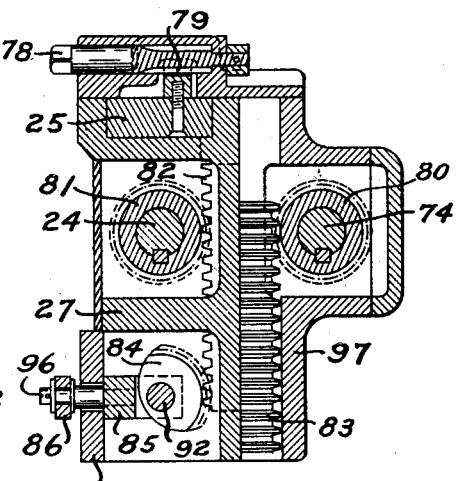
Fig. 10 is a similarly enlarged transverse vertical section through the push-back mechanism of Fig. 9.
Figure 11:
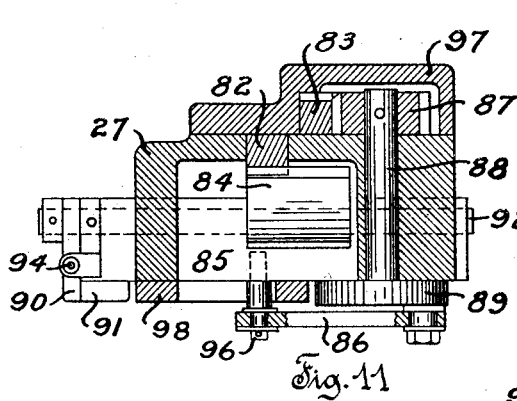
Fig. 11 is a similarly enlarged transverse horizontal section through the push-back mechanism of Fig. 9.
Figure 12:
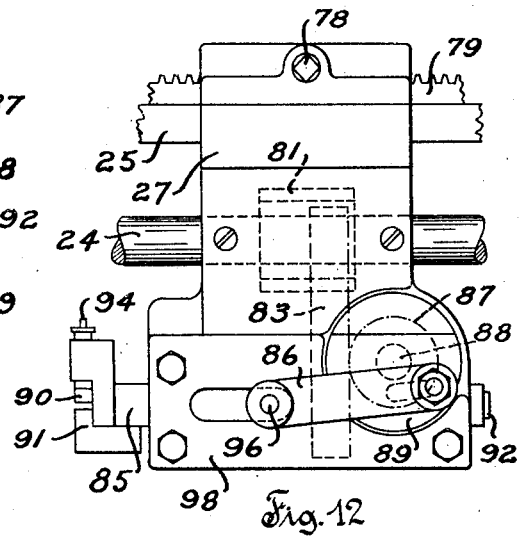
Fig. 12 is a similarly enlarged elevation of the mechanism of Figs. 9 to 11.
Figure 13:
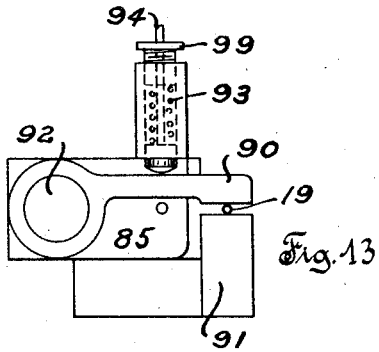
Fig. 13 is a further enlarged end elevation of one of the push-back clamps.
Figure 22:
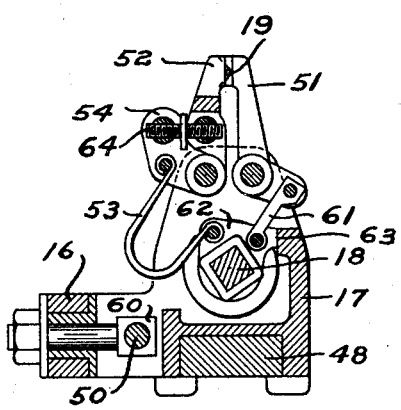
Fig. 22 is a transverse vertical section through one of the improved wire feeding clamps, showing the same in closed position.
Figure 23:
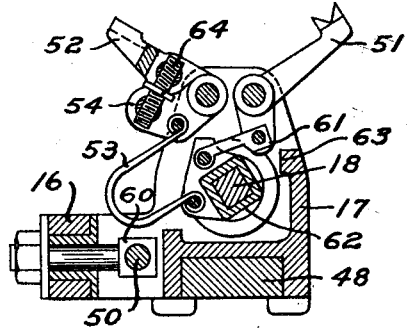
Fig. 23 is a similar section through the clamp of Fig. 22, showing the same in opened position.
Figure 24:
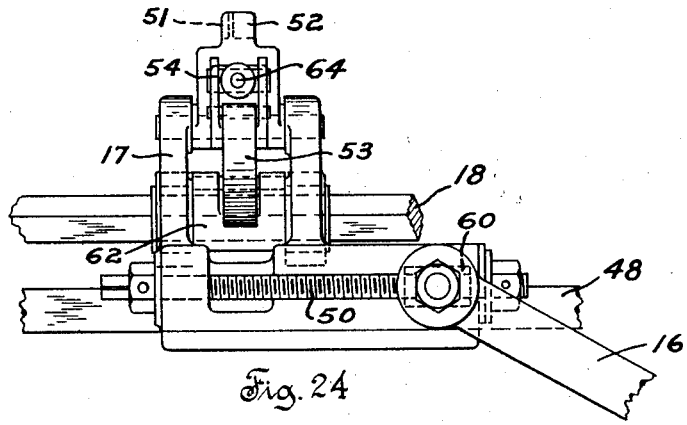
Fig. 24 is a front elevation of the feed clamp of Figs. 22 and 23.
Figure 25:
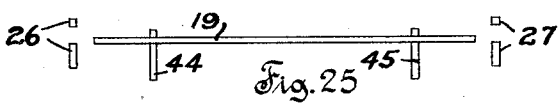
Fig. 25 is a diagram showing a piece of wire after having been cut to proper length and the ends heated, preparatory to application of the push-back clamp.
Figure 26:
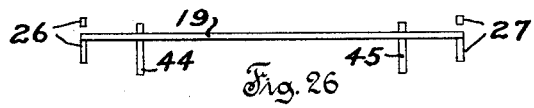
Fig. 26 is a similar diagram showing the push-back clamps moved over the extreme opposite ends of the wire.
Figure 27:
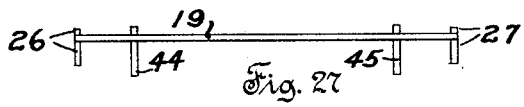
Fig. 27 is a similar view showing the push-back clamps closed but still located at the extreme ends of the wire.

The mechanism for automatically delivering the finished pieces of stock from the machine, consists of a pair of revolvable wire removers 47 adjustably secured to the rotary shaft 23 and movable between the carrier spiders 44, 45, see Figs. 1, 2 and 17. The shaft 23 is rotatable in a clockwise direction as viewed in Fig. 17, whereas the spiders 44, 45 are rotatable counter-clockwise. A final discharge chute 49 disposed above the shafts 21, 22 and beneath the removers 47, serves to deliver the finished product from the machine.

The mechanism for automatically actuating the various treating and conveying elements, consists of a motor 2 or the like connected to a transverse main drive shaft 4 either by belting or by means of spur gears 3, see Figs. 1, 2, 3, 4 and 5. The main shaft 4 is connected by gearing 5 to another shaft 7, and may be provided with a crank 10 for manual operation of the machine, the shaft 7 being operatively connected through spur gearing 6, with a cam shaft 9. Cams 55, 56 secured to the shaft 9, coact with rollers 57 carried by a bell-crank 11 secured to the stock feed actuating shaft 12, the coaction being such that as the cam shaft 9 is rotated at a predetermined speed, the crank 13 will be oscillated and the feed clamp will be moved back and forth at predetermined speeds. The auxiliary drive shaft 7 may also be operatively connected by means of bevel gearing 8, to one end of a longitudinally disposed driving shaft 22, the opposite end of which is connected by means of spur gearing 42 to the remover actuating shaft 23. Secured to a medial portion of the shaft 22, is a series of actuating cams 37, 34, 41 and a disk 30, the latter of which carries a pair of rollers 76 cooperable with slots 77 in a rotor 31 rotatably mounted upon the fixed shaft 21, see Figs. 1, 3, 17, 19 and 20. The disk 30 and rotor 31 constitute a Geneva movement for imparting intermittent rotation to the gear set 32 and to the shaft 20 associated therewith, from the constantly rotating shaft 22, and the larger gear of the set 32 may be adjustably connected with the shaft 20 by means of a locking device 75.

The cam 37 has an irregular cam groove 67 coacting with the roller 73 of a push-back clamp actuator 35 which is operatively connected to the shaft 24 by means of a crank and linkage 70, see Figs. 1, 3, 6, 7 and 8. The double cam 34 has an irregular cam groove 68 on one side thereof, coacting with the roller 173 of a push-back clamp actuator 36 which is operatively connected to the shaft 74 by means of a crank and linkage 71. The coaction between the cams 37, 34 and the shafts 74, 24 is obviously such that only intermittent oscillatory motion is transmitted to these shafts by the constantly rotating cams. The double cam 34 has another irregular cam groove 69 on the opposite side thereof, coacting with the roller 273 of a feed clamp actuator 33 which is operatively connected to the square feed-jaw actuating shaft 18 by means of a crank and linkage 72. The coaction between the cam groove 69 and the square shaft 18, is likewise obviously such that only intermittent oscillatory motion is transmitted to the shaft from the constantly rotating cam 34. The various cams, gears and shafts are all supported upon the main frame 46 and are protected by suitable housings and guards, wherever possible.

During normal operation of the improved push-back machine to automatically exploit the new method, the insulated wire stock 19 is received from any suitable source, not shown, and the various mechanisms are set in motion by actuation of the driving motor 2. Assume the wire feed clamp to have been moved to the extreme left as shown in Figs. 2 and 15, the jaws 51, 52 of the feed clamp being closed to firmly grip the extreme end of the incoming wire. The knife blades 38, 117 are then separated so as to permit passage of the feed clamp jaws 51, 52 therebetween without interference, and the carriers 44, 45 are likewise momentarily positioned as shown in Fig. 17, so as to permit unobstructed lateral passage of the feed clamp between the two lowermost sets of carrier hooks. The wire feed clamp is then shifted toward the right along the guide 48, and draws the stock 19 past the plane of the severing knife and past the carriers 44, 45 to the position indicated in Fig. 1, when the movement of the feed clamp stops and the holding clamp 43 becomes effective to retain the admitted stretch of wire taut and to prevent overfeeding. The knife blades 38, 117 then close and become effective to sever the portion of the wire which has been pulled beyond the plane of cutting by the feed clamp, from the source of supply, and the carriers 44, 45 are at the same time angularly advanced to cause the complementary hooks thereof to grasp the piece of wire prior to the moment of severance, and to carry the severed piece beyond the path of travel of the feed clamp. As the carrier hooks pick up the covered piece of stock 19, the jaws 65 are released and move outwardly to firmly grip the piece short distances inwardly of the opposite ends, as shown in Figs. 25 to 29 inclusive. The rotary movement of the carriers 44, 45, is then again arrested and the knife blades 38, 117 are again opened or separated, after which the feed clamp is quickly returned to the extreme left as in Figs. 2 and 15, and the jaws 51, 52 closed preparatory to the next feeding operation.

The pieces of stock 19 thus successively severed from the source of supply and clamped within the hooks of the carriers 44, 45 are advanced step by step with their opposite ends exposed to the arcuate heating zones of the heating devices 28, 29, thereby causing the end coatings to become relatively soft and pliable. While the various elements are moving with comparative rapidity, the ends of the pieces are subjected to the heat for a considerable period of time, due to the intermittent advancement of the carrier hooks.

The end heated pieces of stock 19 are successively delivered by the carriers 44, 45, from the heating zones to the push-back mechanisms. When a complementary set of carrier hooks is advanced toward horizontal position as shown at the left in Fig. 17, the slidable push-back jaw carriers 85 are moved inwardly from the position shown in Fig. 25, so as to permit proper positioning of the opposite ends of the heat treated piece of stock 19 upon the fixed jaws 91. The jaws 90 of the push-back devices 26, 27 which had previously been raised are then closed or moved from the position shown in Fig. 26 to the position shown in Fig. 27.

Figure 28:
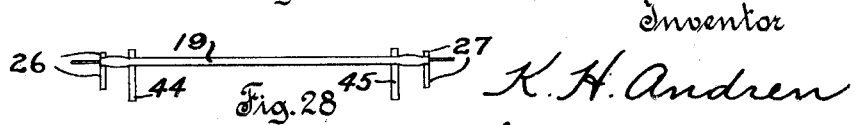
Fig. 28 is a view showing the push-back clamps moved inwardly along the wire to remove the insulation from the wire ends.
Figure 29:
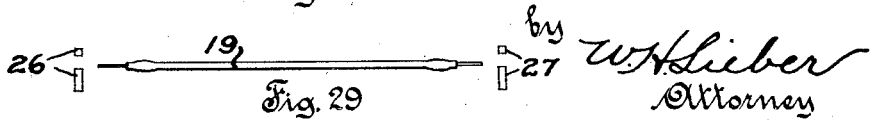
Fig. 29 is a view showing the piece of wire after final treatment and with the push-back clamps removed therefrom.

Directly following this closing operation, the jaws of the push-back devices 26, 27 are automatically moved along the piece of stock 19 inwardly of the ends thereof as shown in Fig. 28, thereby pushing the softened insulation back and exposing the opposite ends of the wire. This operation causes a slight bulge of the insulation as shown in Fig. 28, and the coating quickly hardens and sets in this position. The clamping jaws 91, 90 of the push-back devices 26, 27 are subsequently quickly opened and withdrawn as shown in Fig. 29, whereupon the carriers 44, 45 again advance and the revolving stock removers 47 are swung about to displace the finished pieces of stock 19 from the carrier hooks as the clamping jaws 65 thereof are automatically released. The removers 47 gently toss the finished pieces of stock upon the chute 49 which delivers the same from the machine.

The foregoing cycle of operations is quickly performed upon each of the successive pieces of stock 19, which are thus automatically severed from the supply and have their opposite ends effectively bared of insulation. For a predetermined setting of the various adjusting mechanisms, all of the successive wires or pieces, will be of exactly equal lengths, and the ends will be bared exactly equal distances. The length of the pieces can be readily varied by changing the throw of the feed crank 13 with the aid of the adjusting screw 58, and by correspondingly changing the position of the carriers 44, 45 and of the heating elements 28, 29 with the aid of the pinions 101 coacting with the rack teeth 100 on the intermittently revolving shaft 20. The position of the feed clamp relative to the entering wire stock, may be conveniently adjusted by manipulation of the threaded rod 50, and the pressure exerted by the jaws 51, 52 may likewise be varied by adjustment of the threaded element 64. The rack 79 and the pinions 78 cooperating therewith, facilitate adjustment of the positions of the push-back mechanisms or devices 26, 27, and the caps 99 likewise facilitate proper tensioning of the springs 98. Various other parts of the machine are also readily adjustable to insure rapid and most efficient functioning of the several mechanisms in the manner contemplated.

The cams 55, 56 and the bell crank 11 may be formed to produce relatively rapid feeding motion of the feed clamp, but even more rapid return movement thereof to initial feeding position. The groove 69 in the cam 34 is formed to quickly close and open the feed clamping jaws 51, 52 at the proper moments, and to retain these jaws closed and open during the proper periods. The grooves 67, 68 in the cams 37, 34 respectively, produce the desired operation of the push-back devices at the proper times, and maintain the jaws 90, 91 of these devices open and closed during the proper periods. The cam 41 on the shaft 22, functions to actuate the knife blades 38, 117 at the desired moment, and also serves to maintain these blades as well as the clamp 43, 109, separated or open during the proper period. The Geneva movement disposed between the shafts 22, 21 and transmitting motion through the gearing 32 to the shaft 20, serves to intermittently rotate the shaft 20 and the elements carried thereby, by angular increments equal to half the distances between complementary sets of hooks on the carriers 44, 45, and in properly timed relation to the feeding, push-back and discharge mechanisms, so that the entire machine operates automatically and methodically as contemplated, to effectively exploit the improved process.

The heating elements 28, 29 may be regulated to avoid burning or scorching of the insulation, and marring or damaging of the wire such as occurs with the use of stripping knives, is obviously eliminated. The improved push-back machine has been placed into extensive commercial use and has thoroughly demonstrated its ability not only to produce a product far superior to that resulting from the use of the ordinary stripping machines, but also to treat wire from which the insulation could not be effectively removed by any prior automatic machinery. The mechanism is also adapted to simultaneously remove insulation from both of the opposite ends of successive pieces of stock, whether or not the insulation has been preheated, this being a feature which is not embodied in any known prior automatic machine. The improved machine is rigid and compact in construction, and is so adjustable as to make it highly flexible in operation.

It should be understood that it is not desired to limit the present invention to the exact sequence of steps of the process or to the precise details of construction of the machine herein specifically illustrated and described, for various modifications within the scope of the appended claims may occur to persons skilled in the art.

It is claimed and desired to secure by Letters Patent:—

1. In combination, a feed clamp, means for moving said clamp to feed a definite length of insulated wire from a source of supply, means for severing the fed length from said source, means for heating the insulation at the opposite ends of the severed piece, clamping means for gripping the heated insulation at the opposite ends of the piece, and means for moving said clamping means along the wire to remove the heated insulation from the ends of the wire.

2. In combination, a feed clamp movable to feed a definite length of insulated wire from a source of supply, means for severing the fed length from said source, means for heating the insulation at the opposite ends of the severed piece, and means for clamping the heated insulation at the opposite ends of the wire and for pushing said insulation along the wire inwardly of the ends thereof.

3. In combination, a feed clamp, a wire carrier movable across the path of movement of said clamp, means for intermittently moving said carrier to successive positions across and clearing the path of movement of said clamp, and means for moving said clamp across the path of movement of said carrier while the latter is at rest.

4. In combination, a set of carriers formed to engage a piece of wire inwardly of its opposite ends, means for heating the opposite ends of said piece while being transported by said carriers, and means for subsequently removing heated material from said ends while said pieces are engaged by said carriers.

5. In combination, a carrier formed to intermittently advance a wire laterally along a definite path, a clamp movable longitudinally along the wire to remove insulation from the end thereof while said carrier is at rest, and means for removing the wire from said carrier after removal of said clamp.

6. In combination, a carrier having a series of intermittently movable wire transporting hooks, means for clamping pieces of wire to said hooks with the ends of the wires projecting, and a clamp movable longitudinally over the projecting end of each wire to remove insulation from said ends while said carrier hooks are at rest.

7. In combination, laterally spaced carriers having complementary sets of intermittently movable wire transporting hooks, means associated with said hooks for clamping pieces of wire inwardly of their opposite ends, and means for removing the insulation from the opposite end of each piece of wire while the carrier hooks supporting the same are at rest.

8. The method of removing insulation from the opposite ends of a piece of wire, which comprises, heating the insulation at the ends of the piece, pushing the heated insulation along the wire away from the said ends, and maintaining the insulation in pushed-back position until set.

9. The method of removing insulation from a portion of a wire, which comprises, heating the insulation, clamping the heated insulation at the portion of the wire which is to be bared, and shifting the clamped insulation along the wire a definite distance.

10. The method of removing insulation from opposite ends of a piece of wire, which comprises, heating the insulation at the ends of the piece, clamping the heated insulation, and shifting the clamped insulation inwardly along the wire a definite distance.

11. The method of removing insulation from the opposite ends of a piece of wire, which comprises, heating the insulation at the ends of the piece, simultaneously clamping the insulation at both of the opposite ends of the piece, and shifting the clamped insulation inwardly along the wire a definite distance.

12. The method of removing insulation from the opposite ends of a piece of wire, which comprises, heating the insulation at the ends of the piece, clamping the insulation at both of the opposite ends of the piece, shifting the clamped insulation inwardly along the wire a definite distance, and momentarily maintaining the clamped insulation in pushed back position.

13. In combination, means for heating the covering adjacent to the end of a wire, a clamp for engaging the heated portion of the covering, means for shifting said clamp inwardly from the end of the wire, and means for momentarily holding the wire and clamp in fixed position after said shifting operation.

14. In combination, means for heating the covering adjacent to the opposite ends of a piece of wire, clamps for engaging the heated portions of the covering, means for simultaneously shifting said clamps inwardly from the adjacent ends of the piece, and means for momentarily holding the wire and clamps in fixed position after said shifting operation.

15. In combination, a pair of spaced heating means and a pair of spaced means for engaging the ends of a covering upon a wire, a wire severing means adjacent the plane of one of the heating means and covering end engaging means, means for feeding a length of wire from a source of supply past the severing means to a position between the heating means and the covering end engaging means; means for operating the severing means and for bringing the severed sections and the heating means, one with respect to the other, into operative relation to the ends of the severed sections of the wire and the covering end engaging means and the wire, one with respect to the other, into engagement with the ends of the covering of the wire and for causing the covering end engaging means to move toward each other and so move the heated covering ends back from the ends of the wire.

16. In combination, a pair of spaced heating devices and a pair of spaced clamps for engaging the ends of a covering upon a wire, a wire severing cutter adjacent the plane of one of said devices and clamps; means for feeding a length of wire from a source of supply to a position between the planes of said heating devices and clamps, means for operating the cutter and for bringing the heating devices into operative relation to the ends of the severed wire and for subsequently bringing the clamps into operative relation to the heated covering at the wire ends, and means for moving the clamps to push the heated end coverings along the wire.

17. In combination, a pair of spaced heating devices, a pair of similarly spaced clamps lying in the planes of said devices, means for feeding a length of covered wire from a source of supply to a position between said planes, means for bringing said devices into operative relation to the ends of the wire, means for subsequently bringing said clamps into operative relation to the heated coverings at the wire ends, and means for moving the clamps to push the heated end coverings along the wire.

18. In combination, a pair of spaced simultaneously movable heating devices, a pair of similarly spaced clamps lying in the planes of said devices, means for feeding a length of covered wire to a position between said planes, means for bringing said devices into operative relation to the wire ends and for moving said devices to transfer the wire toward said clamps, and means for operating said clamps to engage the heated wire end coverings and to move the latter along the wire.

19. In combination, laterally spaced heating devices, similarly spaced clamps disposed near said devices, means for feeding a length of covered wire to a position between said devices, means for bringing said devices into operative relation to the ends of the wire, means for subsequently bringing said clamps into operative relation to the heated coverings at the wire ends, and means for relatively moving the clamps and wire to push the heated coverings along the wire.

20. In combination, laterally spaced heating devices, similarly spaced clamps disposed near said devices, means for feeding successive lengths of covered wire to positions between said devices, means for bringing said devices into operative relation to the opposite ends of the successive wires, means for subsequently bringing said clamps into operative relation to the heated coverings at the wire ends, and means for intermittently moving the clamps toward each other to push the heated coverings along the successive wires.

In testimony whereof, the signature of the inventor is affixed hereto.

KARL H. ANDRÉN.